US010921211B2

(12) United States Patent
Puech et al.

(10) Patent No.: US 10,921,211 B2
(45) Date of Patent: Feb. 16, 2021

(54) DEVICE FOR SIMULATING THE CENTRIFUGAL ACCELERATION APPLIED TO AT LEAST ONE AERONAUTICAL TURBOMACHINE ROTOR BLADE

(71) Applicant: SAFRAN AIRCRAFT ENGINES, Paris (FR)

(72) Inventors: Guillaume Julien Puech, Moissy-Cramayel (FR); Ulrich Vincent Max Dubois, Moissy-Cramayel (FR); Pierre Yves Heinry, Moissy-Cramayel (FR); Thibaut Michel Lucien Viller, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 138 days.

(21) Appl. No.: 16/463,112

(22) PCT Filed: Nov. 21, 2017

(86) PCT No.: PCT/FR2017/053192
§ 371 (c)(1),
(2) Date: May 22, 2019

(87) PCT Pub. No.: WO2018/096255
PCT Pub. Date: May 31, 2018

(65) Prior Publication Data
US 2020/0072700 A1 Mar. 5, 2020

(30) Foreign Application Priority Data
Nov. 24, 2016 (FR) ..................................... 1661475

(51) Int. Cl.
*G01M 15/14* (2006.01)
*G01M 9/06* (2006.01)
*G01M 15/02* (2006.01)

(52) U.S. Cl.
CPC ............ *G01M 9/065* (2013.01); *G01M 15/02* (2013.01); *G01M 15/14* (2013.01)

(58) Field of Classification Search
CPC .............................. G01M 9/065; G01M 15/14
(Continued)

(56) References Cited

U.S. PATENT DOCUMENTS 3,690,160 A    9/1972  Kriesten
5,942,682 A * 8/1999  Ghetzler ................. G01M 9/06
                                                  73/147

(Continued)

FOREIGN PATENT DOCUMENTS

EP        2 985 582 A1    2/2016

OTHER PUBLICATIONS

International Search Report for PCT/FR2017/053192 dated Feb. 27, 2018 [PCT/ISA/210].
French Search Report for FR1661475 dated Aug. 10, 2017.

*Primary Examiner* — Eric S. McCall
(74) *Attorney, Agent, or Firm* — Sughrue Mion, PLLC (57) ABSTRACT

The invention relates to a device for simulating the centrifugal acceleration applied to at least one aeronautical turbomachine rotor blade. This device is notable in that it comprises at least one rotor disc (2) comprising a rim in which there are formed a plurality of pockets (23) delimited by two lateral teeth (24) and at least one simulation test (3) which comprises a screw (32), a spacer (33) and a dummy blade (31), in the dummy blade comprises a bore (347), which is tapped over at least part of its length and in that the dummy blade, the screw and the spacer are configured and arranged in such a way that when the screw is screwed into the tapped bore, the root (35) of the dummy blade is engaged in the pocket in the disc, the screw comes into abutment against the spacer and presses same against the two lateral teeth situated one on each side of the pocket in the rotor disc (Continued)

and that this causes the dummy blade to move towards the outside of the disc.

7 Claims, 6 Drawing Sheets

(58) Field of Classification Search
USPC .............................. 73/112.01, 118.02, 118.03
See application file for complete search history.

(56) References Cited

U.S. PATENT DOCUMENTS

| | | |
|---|---|---|
| 6,250,166 B1 | 6/2001 | Dingwell et al. |
| 2005/0086942 A1* | 4/2005 | Adibhatla ................. F02C 9/28 60/772 |
| 2019/0332742 A1* | 10/2019 | Anfriani ................. F01D 5/027 |
| 2020/0233990 A1* | 7/2020 | Leynaud ................. G06F 30/23 |

\* cited by examiner

DEVICE FOR SIMULATING THE CENTRIFUGAL ACCELERATION APPLIED TO AT LEAST ONE AERONAUTICAL TURBOMACHINE ROTOR BLADE

CROSS REFERENCE TO RELATED APPLICATIONS

This application is a National Stage of International Application No. PCT/FR2017/053192, filed on Nov. 21, 2017, which claims priority from French Patent Application No. 1661475, filed on Nov. 24, 2016, the entire contents of each of which are herein incorporated by reference in their entireties.

GENERAL TECHNICAL FIELD

The invention is situated in the field of measuring the permeability of the ventilation circuit of an aeronautical turbomachine, of a turbine in particular, for example a low-pressure turbine.

The invention relates to a device for simulating the centrifugal acceleration applied to an aeronautical turbomachine rotor blade.

PRIOR ART

Knowledge of the permeability of the different ventilation circuits of a turbomachine is essential for ensuring its proper operation and to optimize its efficiency. These ventilation circuits provide in particular for the cooling of the turbomachine, the pressurization of the oil enclosures and the axial balance of the turbomachine.

Moreover, the extraction of air which feeds these ventilation circuits has a direct influence on the performance of the turbomachine. Thus, too great an extraction penalizes the performance of the turbomachine, while an under-dimensioned extraction causes problems with cooling, with pressurization, etc.

In order to optimize the flow rates of these air extractions, it is necessary to measure the permeability of these ventilation circuits by carrying out tests.

These permeability tests are accomplished on a test bench which allows the ventilation circuit to be tested to be supplied with an air flow. The permeability of the system to be tested, (for example a turbomachine) is thus characterized for different values of the ratio of pressures between the air supply and the air outlet, this by increasing the air inlet flow rate.

Recall that a turbomachine comprises a rotor disk, driven in rotation by a rotating shaft, this disk comprising a peripheral rim in which are formed attachment cells for the blade roots. To allow their attachment, the cell and the blade root have complementary shapes, the blade root being traditionally installed by axial displacement in the cell so as to be retained radially.

Figure 1:
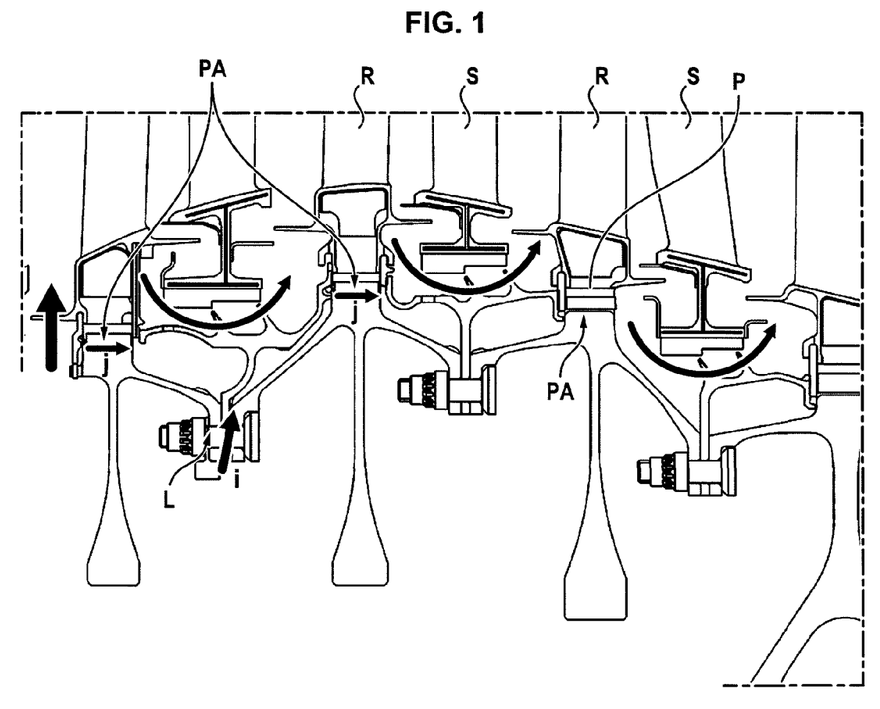
FIG. 1 is a longitudinal section view of a portion of an aeronautical turbomachine comprising a rotor and a stator.

In the attached FIG. 1 can be seen by way of an example the schematic of a ventilation circuit of a low-pressure turbine. The blades of the rotor bear the label R and those of the stator, the label S.

The air of the ventilation circuit circulates by different structural openings which exist in the turbine, for example lunula L (arrows i) or the passages PA under the roots P of the rotor blades R (arrows j).

It is also noted that air escapes via small existing clearances between the different parts, so that leaks exist.

In the particular case of a turbine, it has been possible to observe the existence of air leaks in proximity to the root of each rotor blade.

Figure 2:
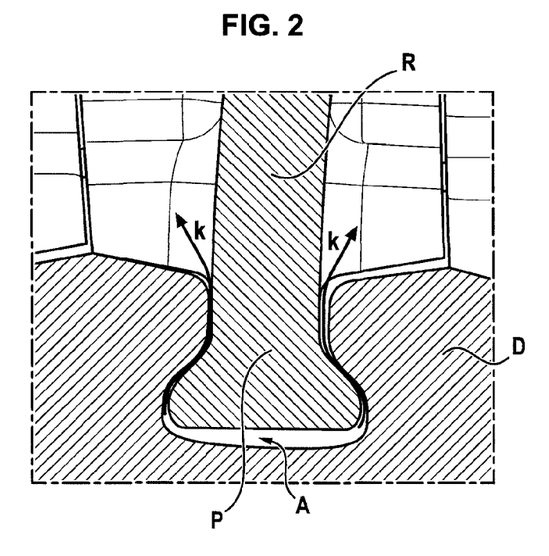
FIG. 2 is a transverse section view of a portion of the rotor disk and of the root of a blade of this rotor.

In the attached FIG. 2 can also be seen a portion of the rotor disk D equipped with a cell A for receiving the root of a rotor blade R. The air circulates under the blade root then escapes (in the form of air leaks) between the bearing surfaces of the cell A and the root P of the blade R (see arrows k).

To be accurate, the characterization of permeability necessitates being representative of the passage sections of the different structural openings, but also of the leak passages.

Moreover, this characterization must also take real operating conditions into account. Thus, when the turbomachine operates, the rotor disk is driven in rotation and the blades R are subjected to centrifugal acceleration which tends to pull them radially toward the outside, i.e. toward the upper part of FIG. 2, which can have an effect on the air flow.

Yet centrifugal acceleration is complex to implement while still allowing the accomplishment of the required measurements. It is therefore necessary to simulate centrifugal acceleration. To this end, each turbine disk tested must be equipped with its blades, under a loading representing the centrifugal acceleration to which it is subjected to ensure the representativeness of the passage sections under the root P of the blade and of the lateral leak passages between the throat of the root and the disk.

One technical solution could consist of placing a rotor disk equipped with all of its blades on a device which would allow pulling axially on the free end of each blade, so as to simulate the centrifugal acceleration to which it is subjected.

However, this technical solution is not practicable for a certain number of reasons:
- it assumes using real blades which risk being damaged, particularly at their roots which are fragile,
- it also assumes using a tension structure disposed all around the blades positioned on the rotor disk, yet this tension structure, which would slightly resemble a bicycle wheel, risks being deformed non-uniformly; consequently, the centrifugal acceleration to be applied to each blade would be complex to control,
- and as soon as one blade is placed under tension, there would be a risk of releasing tension on another (radius effect of a bicycle wheel),
- it would be difficult to accomplish the tensioning of different stages of blades simultaneously,
- finally, the device allowing these tensions to be accomplished on the periphery of the blades would have to be of very large dimensions.

Also known according to documents FR 2 963 425, U.S. Pat. Nos. 6,250,166, 3,690,160 and EP 2 985 582 is a simulation device comprising a frame, a test piece simulating a blade root of an aeronautical turbomachine, a counter-test piece simulating a cell of a turbomachine rotor disk and finally tensioning means allowing pulling on at least one of the ends of the test piece or of the counter-test piece, in order to simulate the forces to which the blade is subjected during the operation of the turbomachine.

However, such a device is not usable in the application considered.

In fact, it is necessary to accomplish the test on an assembled turbomachine (use of engine parts for the disk, the labyrinth seal, etc.). The device described in the aforementioned documents allows a force to be applied only to a single false blade. If it had to be accomplished for each blade of a turbomachine stage, the situation described previously, of a bicycle wheel assembly, would recur. Moreover, if it was required to apply the force using a ram for each blade, several hundred rams would then be required and the installation would be monumental.

PRESENTATION OF THE INVENTION

The invention has as its purpose to propose a simulation device which is representative of a turbomachine rotor disk, equipped with at least one of its blades and preferably with all of them, under operating conditions, i.e. subjected to centrifugal acceleration (or to a portion of the centrifugal acceleration), and which allows accomplishing the permeability measurements previously described, while dispensing with the aforementioned disadvantages of the prior art.

To this end, the invention relates to a device for simulating the centrifugal acceleration applied to at least one aeronautical turbomachine rotor blade, comprising at least one test piece for simulating a turbomachine rotor blade, said test piece comprising a blade simulation part, called a "false blade", which comprises a body and an attachment end having the shape of a blade root. In conformity with the invention, this device comprises at least one rotor disk, this rotor disk comprising a peripheral rim in which are formed a plurality of cells leading to the outer surface of said rim, each cell being delimited by two lateral teeth and formed to receive the attachment end of said false blade, said simulation test piece comprising a screw and a spacer, said false blade comprising a bore tapped over at least a portion of its length, this tapping corresponding to the thread of said screw, and the false blade, the screw and the spacer are configured and disposed with respect to one another so that, when the screw is screwed inside the tapped bore while the attachment end of said false blade is engaged in the cell of the disk, the screw comes into abutment against said spacer and presses it against the two lateral teeth situated on either side of said rotor disk cell and this causes the displacement of the false blade toward the outside of the disk, so as to simulate a centrifugal acceleration applied to said false blade.

Thanks to these features, this device allows simulating the centrifugal acceleration which would be applied to these blades during the rotation of the rotor, this in a manner that is very simple to implement because it is accomplished by simple screwing with a test piece of small dimensions. This simulation device then allows the accomplishment of the aforementioned permeability measurements.

According to other advantageous and nonlimiting features of the invention, taken alone or in combination:
- the attachment end has the shape of a blade root comprising two opposite lateral faces each having the shape of a lobe, the two lobes joining in a throat and the rotor disk cell having on each of its two opposite inner lateral faces a retaining cavity having a shape corresponding to that of one of said lobes, so that the attachment end can be received in said cell;
- each lobe extends over the entire length of the attachment end;
- the body of the false blade comprises a face situated in proximity to the attachment end of the false blade, called the "proximal face" and a face opposite to said proximal face, called the "distal face", the proximal face joining said throat and being larger than the same, the bore of the false blade being provided in said body and comprising a tapped distal portion which leads to the distal face of the body and an untapped proximal portion which leads to the proximal face of the body on either side of the throat of the attachment end, said spacer being dimensioned to be able to be received in said bore and slide in its proximal portion, so that when the screw is screwed inside the tapped distal portion, while the attachment end of said false blade is engaged in the cell of the disk, the screw comes into abutment against said spacer and presses the proximal face thereof against the two lateral teeth situated on either side of said rotor disk cell and this causes the displacement of the false blade toward the outside of the disk, so as to simulate a centrifugal acceleration applied to said false blade;
- the tapped bore is provided inside the attachment end along the axis of the throat and leads to the outside on the distal face of said throat, said screw comprises a shank and a head, said shank comprising a threaded proximal portion and a unthreaded distal portion extending between the proximal portion and the head, the spacer has an untapped bore passing through it for passage of the shank of the screw, so that when the screw is introduced through the passage bore of the space, then screwed inside the tapped bore, while the attachment end of said false blade is engaged in the cell of the disk, the screw head comes into abutment against said spacer and presses it against the two lateral teeth situated on either side of said rotor disk cell, and this causes the displacement of the false blade toward the outside of the disk so as to simulate a centrifugal acceleration applied to said false blade;
- the body of said false blade comprises a recess formed to receive a grommet of said rotor disk and this recess extends in a plane parallel to the screwing axis of the screw in the false blade and leads to the attachment end;
- the spacer is made in a material with less mechanical strength than the material constituting the lateral teeth of the disk.

PRESENTATION OF THE FIGURES

Other features and advantages of the invention will appear from the description that will now be given of it, with reference to the appended drawings which show, by way of indication but without limitation, two possible embodiments.

In these drawings.

DETAILED DESCRIPTION OF THE INVENTION

Figure 3:
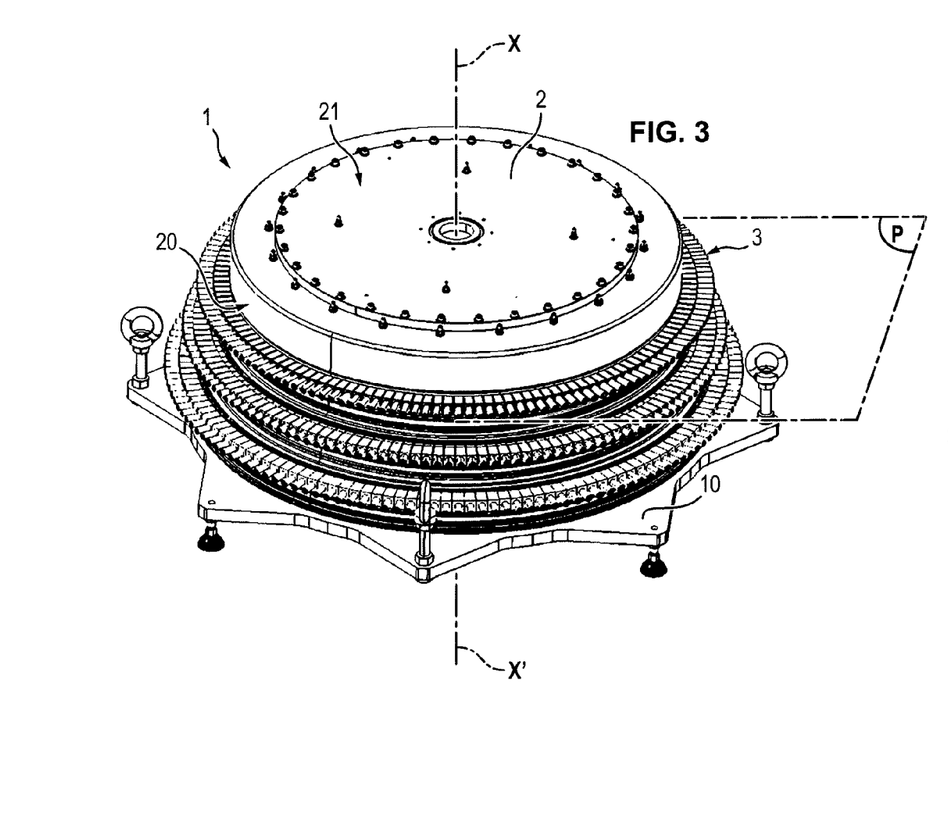
FIG. 3 is a perspective view showing an embodiment of a device conforming to the invention for simulation of the centrifugal acceleration applied to at least one blade of a rotor disk of a turbomachine.

In FIG. 3 can be seen a device 1 for simulating the centrifugal acceleration applied to a blade of a rotor disk of a turbomachine, conforming to the invention.

This device 1 preferably comprises a support 10, on which is mounted at least one disk 2, here for example three stacked disks. These disks are coaxial with the central axis X-X'. The device 1 also comprises a plurality of test pieces 3 for simulating a rotor blade of a turbomachine, these test pieces being attached to the periphery of each disk 2, as will be described later in more detail.

By way of a purely illustrative example, a disk 2 can thus support approximately one hundred and fifty test pieces 3.

The test pieces 3 are attached to the disk 2 so as to extend radially with respect to the central axis X-X' thereof.

Preferably, the disks 2 used on the simulation device 1 conforming to the invention are identical to those used in the rotor of an aeronautical turbomachine.

It will be noted that when the disk 2 is used in an aeronautical turbomachine, the axis X-X' constitutes its axis of rotation. In the present simulation device 1, the disk(s) 2 remain(s) immobile.

Figure 11:
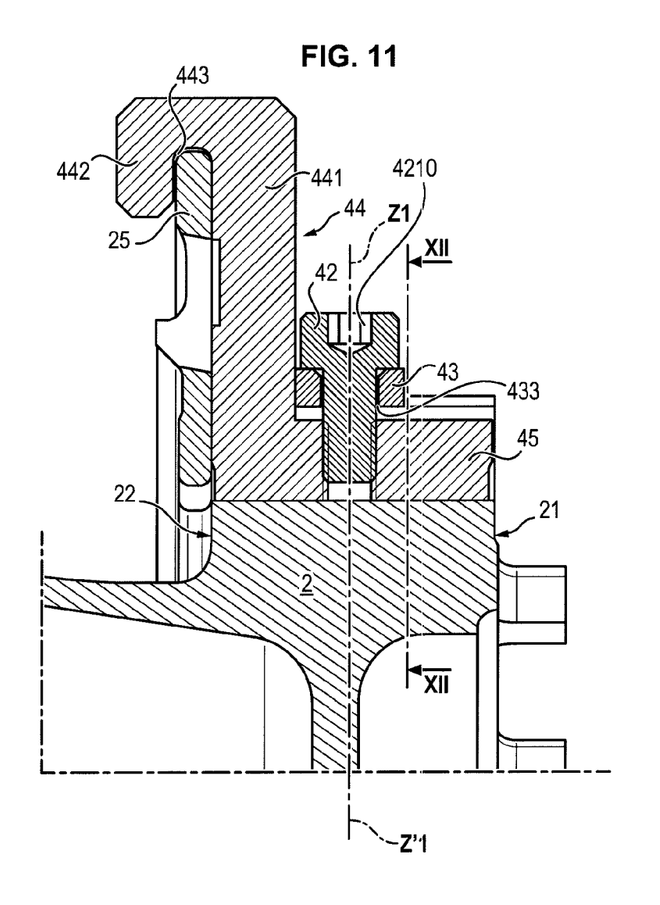
FIG. 11 is a section view of the simulation test piece of FIG. 8, taken along the section plane X-X, inserted into a portion of the rotor disk.

Each disk 2 has two opposite faces, namely a front face 21 and a rear face 22, perpendicular to the axis X-X', the rear face 22 being visible only in FIG. 11.

The disk 2 further comprises peripheral rim 20, in which are formed the attachment cells 23, allowing the attachment of the blades by their roots.

Figure 4:
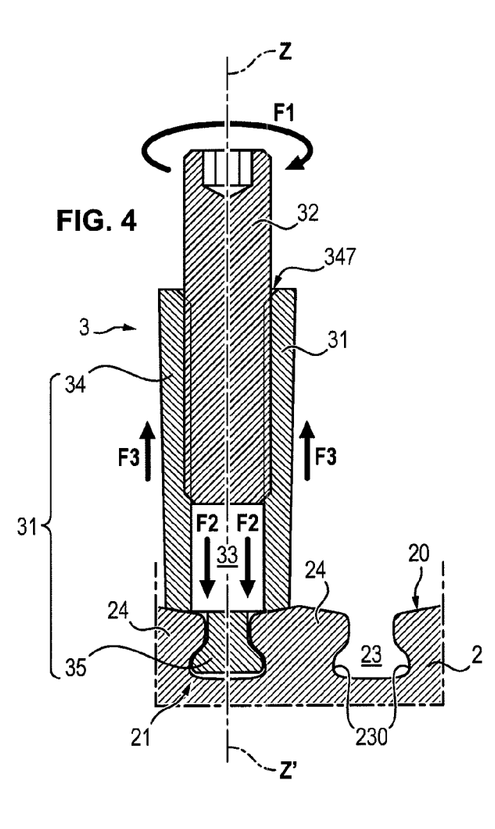
FIG. 4 is a transverse section view of a portion of the rotor disk and of a simulation test piece of a rotor blade belonging to the device shown in FIG. 3, this section being made along the plane P perpendicular to the axis X-X' of said rotor disk.

Each cell 23 is bordered by two contiguous teeth 24, visible in FIG. 4.

Each cell 23 extends along a longitudinal axis parallel to the central axis X-X' of the disk.

The shape of the cell is complementary to that of the blade root which must be attached to it. This shape will be described in more detail later.

A first embodiment of a test piece 3 conforming to the invention will now be described while referring to FIGS. 4 to 7.

The test piece 3 comprises three parts, namely a blade simulation part 31, called the "false blade", a screw 32 and a spacer 33.

The test piece 3 is longitudinal and extends overall along an axis Z-Z' which, when the test piece 3 is mounted on the disk 2, is perpendicular to the axis X-X'. This axis Z-Z' also corresponds to the direction in which is exerted the centrifugal acceleration which it is desired to simulate.

Figure 5:
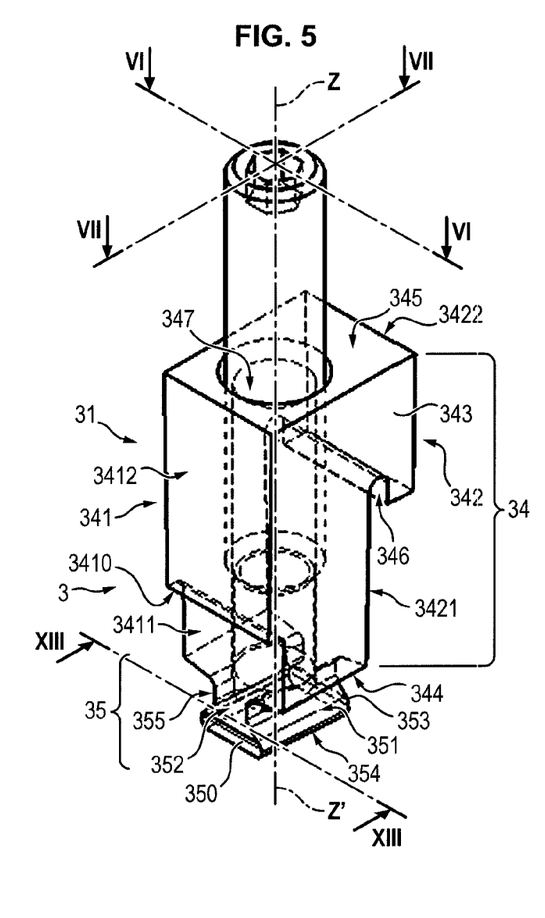
FIG. 5 is a perspective transparent view of a first embodiment of a simulation test piece of a rotor blade conforming to the invention.
Figure 6:
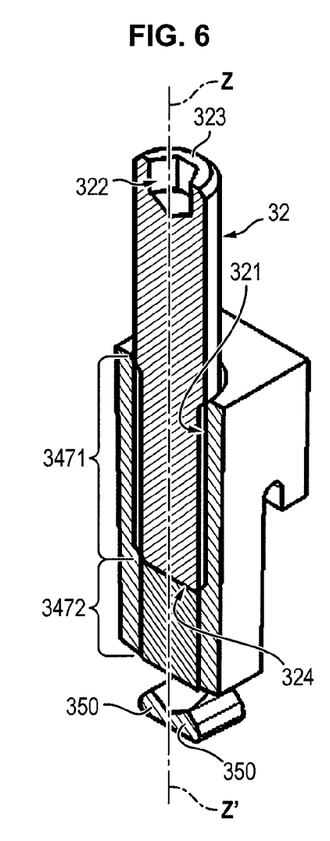
FIGS. 6 and 7 are section view of the same test piece, taken respectively along the section planes represented by the lines VI-VI and VII-VII in FIG. 5.

The false blade 31 comprises a body 34 which is extended by an attachment end 35.

Figure 7:
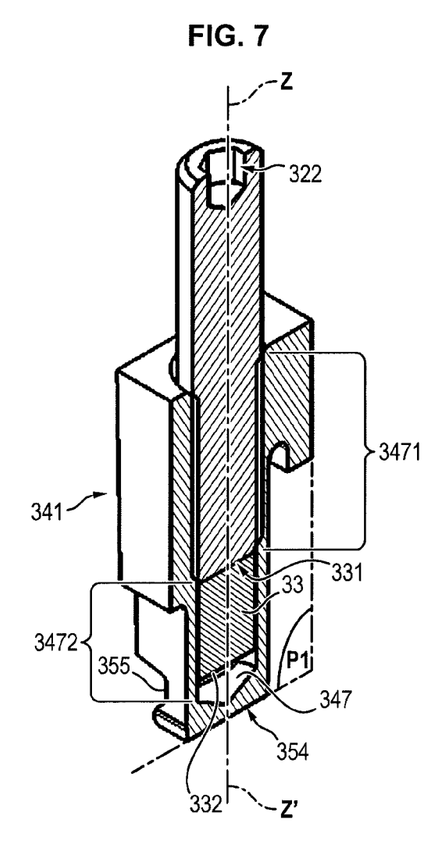

In addition, the test piece 3 has a plane of symmetry P1 passing through the axis Z-Z' and which extends into the section plane of FIG. 7.

The body 34 has substantially the shape of a rectangular parallelepiped. It comprises a front face 341 and an opposite rear face 342, (the symmetry plane P1 intersecting these two faces), as well as two lateral faces 343 which join the front face to the rear face. In addition, the body 34 also has a proximal face 344, so called because it is situated in proximity to the attachment end 35, and an opposite distal face 345. The two faces 344 and 345 are perpendicular to the axis Z-Z'.

The front face 341 has an indentation which defines a shoulder 3410. This shoulder splits the front face 341 into two portions, namely a proximal front face 3411 and a distal front face 3412. This shoulder serves mainly for increasing the cross section of the false blade at the thread. The face 3412 is at the same axial dimension (along X) as the true blade to allow its integration.

The body 34 is wider at its distal end than at its proximal end, and it has a portion curved rearward which defines, with respect to the main portion of the body, a recess 346. This recess 346 extends in a plane parallel to that of the front 341 and rear 342 faces and leads to the attachment end 35. The longitudinal axis of the recess 346 is perpendicular to the axis Z-Z'.

This recess 346 splits the rear face 342 into a proximal rear face 3421 and a distal rear face 3422.

The recess 346 allows blocking the false blade 31 on an annular seal 25, carried by the disk 2 and visible only in FIG. 11. The proximal rear face 3421 is also pressed against this grommet.

The attachment end 35 simulates a blade root of a turbomachine. In the embodiment illustrated in FIGS. 4 to 7, this blade root has a dovetail shape.

More precisely, this end 35 comprises a lobe 350 on each of its two lateral faces 351. These two lobes 350 are designed to enter into contact with the inner surface of the cell 23 provided in the disk 2, as can be seen in FIG. 4.

Each cell 23 has two lateral inner faces 230 facing one another, a retaining cavity with a shape complementary to one of the lobes being provided on each face 230.

The two lobes 350 thus form two bearing surfaces during the attachment of the test piece 3 in the disk 2, so as to provide for longitudinal retention along axis Z-Z', i.e. radial retention with respect to the disk 2, under actual operational conditions.

The attachment end 35 further comprises a front face 352, preferably flat, situated in the extension in and the same plane as the proximal front face 3411 of the body 34 and an opposite rear face 353, preferably flat, situated in the extension and in the same plane as the proximal rear face 3421 of the body 34. The end 35 further comprises an end face 354, preferably flat, parallel to the distal face 345.

The attachment end 35 joins the body 34 at a narrower zone 355 called the "throat", which has, seen from in front, i.e. from the left side of FIG. 5, a smaller width that that where the lobes 350 are situated.

Each lobe 350 extends over the entire length of the attachment end 35. The assembly of the false blade 31 in the cell 23 of the disk is accomplished by sliding in a direction parallel to the axis X-X' of the disk 2.

The body 34 is pierced by a partially blind bore 347 which extends along the axis Z-Z', from the distal face 345 to which it leads, to the throat 355, as can be seen in FIG. 7.

The bore 347 is "partially blind" in that the drilling does not lead to the end face 354 and does not extend as far as the lobes 350, but stops in the throat 355 as can be seen in FIG. 7.

Figure 13:
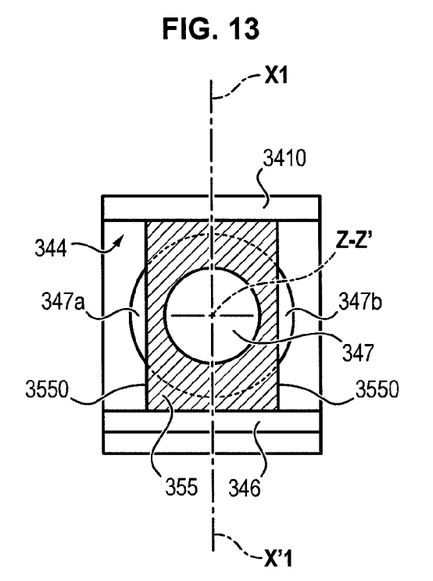
FIG. 13 is an enlarged section view of the test piece of FIG. 5, taken along the section plane represented by the line XIII-XIII.

However, the bore 347 leads to the proximal face 344, on either side of the throat 355, as can be seen in FIG. 13. In other words, the two openings 347a, 347b at which this bore 347 leads to the proximal face 344 of the body 34 on either side of the throat 355 are shaped like a portion of a circle. It will be noted that the diameter of the bore 347 is smaller than the length of the throat 355 with a rectangular cross section.

Moreover, it will be noted that in FIG. 13, the two longitudinal edges 3550 of the throat 355 with a rectangular cross section are parallel to each other and to the longitudinal axis X1-X'1 of the throat.

However, according to a variant not shown in the figures, these two edges 3550 are parallel to one another but offset angularly with respect to the axis X1-X'1 with which they are no longer parallel. The throat then has the cross section of a nonrectangular parallelogram. These edges 3550 are then not parallel to the two lateral faces 343. This is the case when the cells 23 themselves are axis-shifted with respect to the axis of rotation X-X' of the disk 2.

The bore 347 has a tapped distal portion 3471 and an untapped proximal portion 3472. The tapping of the portion 3471 corresponds to the thread of the screw 32 which can thus be screwed into it.

The screw 32 appears here in the form of a cylindrical shank of which at least the proximal end 321 is threaded.

In this embodiment, the screw 32 does not have a screw head. It could have one, however. The manipulation of the screw is accomplished by means of a female impression 322 provided in the distal face 323 of the screw 32.

In the example shown in the figures, this female impression 322 is hexagonal. However, any other female impression shape could be used.

The shank of the screw 32 also has a flat proximal face 324, opposite to the distal face 323.

In the embodiment shown in FIGS. 4 to 7, the spacer 33 is a cylinder of which the outside diameter corresponds, within the limit of sliding clearance, to the inner diameter of the untapped bore 3472. The spacer 33 has a flat distal face 331 and an opposite flat proximal face 332.

The operation of the simulation device 1 according to the invention is the following.

The test pieces 3 are mounted on the disk 2 by engaging the attachment end 35 by sliding into the cell 23 of the disk 2. Then, the spacer 33 is inserted into the bore 347, then the screw 32.

As can be seen in FIG. 4, the screwing of the screw 32 (arrow F1) around the axis Z-Z' has the effect of axially displacing the screw 32, until its proximal face 324 comes into abutment against the distal face 331 of the spacer 33. In so doing, the spacer 33 is pressed against the disk 2.

Here the screw 32 is therefore a pressure screw.

The proximal face 332 of the spacer 33 comes into abutment against the upper face of the two teeth 24 provided on either side of the cell 23 in which the false blade is inserted (arrows F2). This movement is possible because the bore 347 leads to the proximal face 344 on either side of the throat 355 and because it continues into the throat. The false blade 31 being blocked in rotation around the axis Z-Z' (because its attachment end 35 is inserted into the cell 23 and its shape does not allow such a rotation), the fact of continuing the screwing of the screw 32 has the effect of causing the false blade 31 to be displaced toward the outside of the disk 2, i.e. toward the top of FIG. 4 (see arrows F3). The false blade 31 is guided by the thread 321 and the thread 3471, which are complementary.

This displacement is equivalent to the centrifugal acceleration that the blade would be subjected to. The centrifugal acceleration thus simulated is proportional to the tightening torque applied by the screw 32.

A second embodiment of the simulation test piece, labeled 4, will now be described in connection with FIGS. 8 to 12. It operates with the same disk 2 as that previously described.

Figure 8:
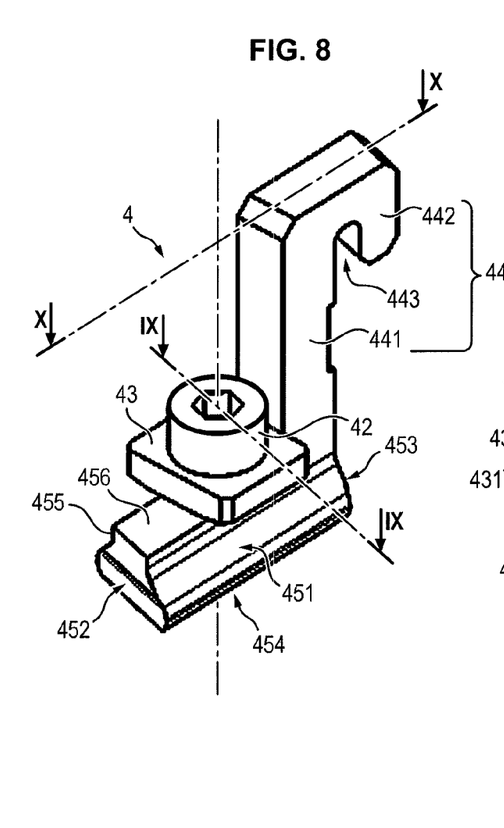
FIG. 8 is a perspective view of a second embodiment of a simulation test piece of a rotor blade conforming to the invention.
Figure 9:
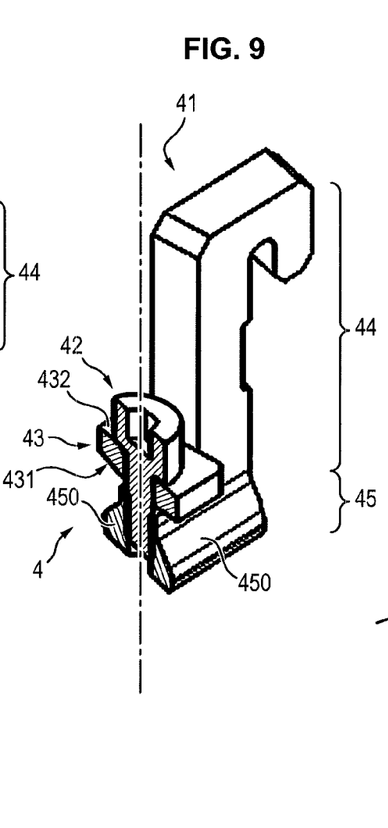
FIGS. 9 and 10 are section view of this same test piece, taken along section planes shown schematically respectively by the lines IX-IX and X-X in FIG. 8.

Like the test piece 3, the test piece 4 comprises three parts, namely a false blade, a screw and a spacer, labeled respectively 41, 42 and 43.

The false blade 41 comprises a body 44 and an attachment end 45. This test piece differs from the preceding one in that the body 44 is offset at one of the ends of the attachment end 45.

The attachment end 45 simulates a turbomachine blade root shaped like a dovetail.

It comprises a lobe 450 on each of its two lateral faces 451. Each lobe 450 extends over the entire length of the attachment end 45. The two lobes 450 cooperate with the inner surface of the cell 23 of the disk 2 as described previously for the test piece 3.

The attachment end 45 further comprises a front face 452, an opposite rear face 453, both preferably flat, and a flat proximal face 454. The attachment end 45 is narrower in its distal portion and forms a throat 455 which terminates in a flat distal face 456.

Figure 10:
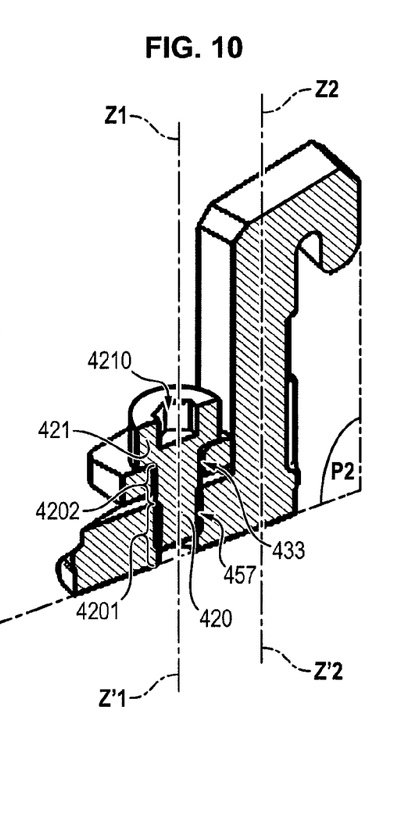

The attachment end 45 is pierced by a bore 457 which extends from its distal face 456 until its proximal face 454, along an axis Z1-Z'1 perpendicular to these two faces. The bore 457 is a through bore, it could however be blind on the side of the face 454.

The bore 457 is tapped on at least a portion of its length starting from the distal face 456.

The test piece 4 has a plane of symmetry P2 passing through the axis Z1-Z'1 and which extends into the section plane shown schematically in FIG. 10 while intersecting the front 452 and rear 453 faces.

The main portion 441 of the body 44 extends longitudinally from the distal face 456 along an axis Z2-Z'2 parallel to Z1-Z'1. The body 44 also has a portion 442 curved toward the rear which defines, with respect to the main portion of the body, a recess 443. The recess 443 extends in a plane parallel to that of the front 452 and rear 453 faces and leads to the attachment end 55. The longitudinal axis of the recess 443 is perpendicular to the axis Z1-Z'1. This recess serves to block the false blade on the grommet 25, as can be seen in FIG. 11.

The screw 42 comprises a cylindrical shank 420 and a screw head 421.

The screw head 421 comprises a female impression 4210. In the example shown in the figures, this female impression is hexagonal. However, any other form of female impression could be used.

The shank 420 has a threaded proximal portion 4201 and an unthreaded distal portion 4202. The thread of the proximal end 4201 corresponds to the tapping of the opening 457.

The spacer 43 is a flat part with little thickness, of square shape for example, which has a proximal flat face 431 and an opposite flat distal face 432. It has an untapped bore 433, which leads to the two faces 431 and 432, passing through it from side to side.

The inner diameter of the bore 433 corresponds, within the limits of clearance, to the outer diameter of the unthreaded distal end 4202.

The operation of the test piece 4 is the following.

Figure 12:
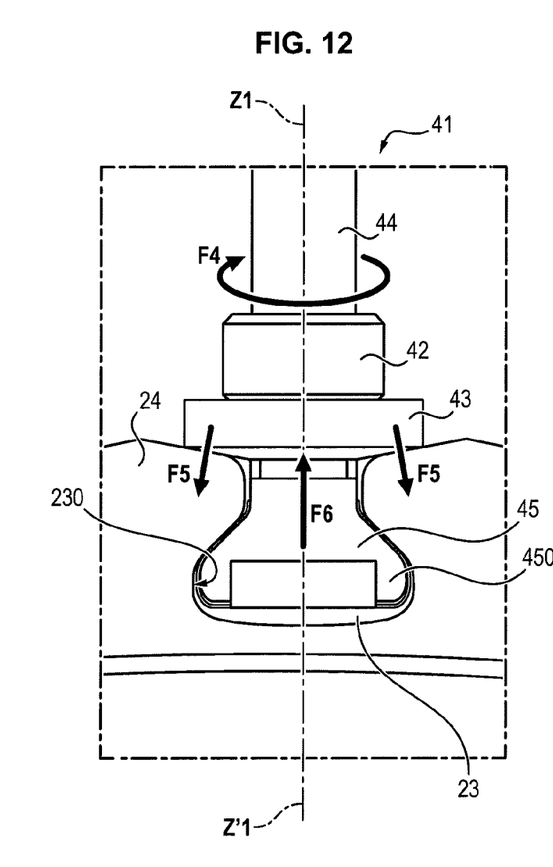
FIG. 12 is an enlarged section view of the test piece of FIG. 11, taken along the section plane represented by the line XII-XII.

The test pieces 4 are mounted on the disk 2 by engaging the attachment end 45 by sliding into the cell 23 of the disk 2. Then, the screw 42 is inserted into the spacer 43, then the assembly is positioned on the false blade 41 so that the screw 42 is screwed into the bore 457.

As can be seen in FIG. 12, the screwing of the screw 42 (arrow F4) around the axis Z-Z' has the effect of displacing axially the screw 42, until the screw head 421 comes into abutment in its turn against the space 43 of which the proximal face 431 comes into abutment against the upper face of the two teeth 24 provided on either side of the cell 23 into which the false blade is inserted (arrows F5).

The false blade 41 being blocked in rotation around the axis Z1-Z'1 (because its attachment end 45 is inserted into the cell 23 and its shape does not allow such a rotation), the fact of continuing screwing the screw 42 has the effect of causing the false blade 41 to be displaced toward the outside of the disk 2, that is toward the top of FIG. 12 (see arrow F6). The false blade 41 is guided in its displacement by the thread 4202 and the thread of the bore 457.

Here the screw 42 is therefore a traction screw.

This displacement is equivalent to the centrifugal acceleration that the blade would be subjected to. The centrifugal acceleration thus simulated is proportional to the tightening torque applied by the screw 42.

In the two aforementioned embodiments, it will be noted that preferably, the spacer 33 or 43 is made of a material of lower mechanical stiffness, i.e. with smaller Young's modulus (rubber for example) or a smaller elastic limit (aluminum for example), than the material constituting the disk 2 (steel for example), to avoid peening (i.e. localized plastic deformation under the influence of high pressure) of the disk 2 at the contact point with the spacer 33.

Other embodiments of the test piece are practicable, provided that it comprises:

an attachment end formed to be received in a cell 23 of the disk and prevent the rotation of the false blade around its longitudinal axis, a false blade of simplified geometry recapturing the necessary interfaces required for its assembly on the disk, a screw and a spacer and the screwing of the screw having the effect of applying the spacer between the two lateral teeth situated on either side of the cell of the disk while causing the displacement of the false blade toward the outside of the disk.

Moreover, the root of the blade could also have a "pine tree" shape with two lobes on each of its lateral faces, the shape of the cell of the disk being appropriately adapted.

The device 1 has numerous advantages enumerated hereafter.

It allows not having to use real blades and not taking the risk of damaging them during tests. It also avoids damaging the rotor disks which will then be mounted in the turbomachine.

It allows fine adjustment because the tension applied to each test piece is unitary, which allows carrying out adjustments when simulating centrifugal accelerations that differ from one blade to another.

The mounting is simple to implement. It is not necessary to have elements of very large dimensions positioned at the outside of a disk equipped with its real blade to simulate the tension on the blades.

There is no need to perform calibration because the tightening torque applied to the screw gives directly the equivalent tension exerted on the false blade.

As can be seen in FIG. 3, it is possible to accomplish several stages of a turbomachine simultaneously and therefore to simulate an operation closer to reality.

Finally, the device is usable with different rotor disks. Depending on the space available on it, it is thus possible to use either the first test piece 3, or the second 4.

The invention claimed is:

1. A device for simulating the centrifugal acceleration applied to at least one aeronautical turbomachine rotor blade, comprising at least one test piece for simulating a turbomachine rotor blade, said test piece comprising a blade simulation part, called a "false blade", which comprises a body and an attachment end having the shape of a blade root, wherein said device comprises at least one rotor disk, this rotor disk comprising a peripheral rim in which are formed a plurality of cells leading to the outer surface of said rim, each cell being delimited by two lateral teeth and formed to receive the attachment end of said false blade, wherein said simulation test piece comprises a screw and a spacer, wherein said false blade comprises a bore tapped over at least a portion of its length, this tapping corresponding to the thread of said screw, and wherein the false blade, the screw and the spacer are configured and disposed with respect to one another so that when the screw is screwed inside the tapped bore, while the attachment end of said false blade is engaged in the cell of the disk, the screw comes into abutment against said spacer and presses it against the two lateral teeth situated on either side of said cell of the rotor disk and this causes the displacement of the false blade toward the outside of the disk, so as to simulate a centrifugal acceleration applied to said false blade.

2. The device according to claim 1, wherein the attachment end has the shape of a blade root comprising two opposite lateral faces each having the shape of a lobe, the two lobes joining in a throat and wherein the cell of the rotor disk has on each of its two opposite inner lateral faces a retaining cavity having a shape corresponding to that of one of said lobes, so that the attachment end can be received into said cell.

3. The device according to claim 2, wherein each lobe extends over the entire length of the attachment end.

4. The device according to claim 2, wherein the body of the false blade comprises a face situated in proximity to the attachment end of the false blade, called the "proximal face" and a face opposite to said proximal face, called the "distal face", the proximal face joining said throat and being larger than the same, the bore of the false blade being provided in said body and comprising a tapped distal portion which leads to the distal face of the body and an untapped proximal portion which leads to the proximal face of the body on either side of the throat of the attachment end, said spacer being dimensioned to be able to be received in said bore and slide in its proximal portion, so that when the screw is screwed inside the tapped distal portion, while the attachment end of said false blade is engaged in the cell of the disk, the screw comes into abutment against said spacer and presses the proximal face thereof against the two lateral teeth situated on either side of said cell of the rotor disk and this causes the displacement of the false blade toward the outside of the disk, so as to simulate a centrifugal acceleration applied to said false blade.

5. The device according to claim 2, wherein the tapped bore is provided inside the attachment end along the axis of the throat and leads to the outside on the distal face of said throat, and wherein said screw comprises a shank and a head, said shank comprising a threaded proximal portion and an unthreaded distal portion extending between the proximal portion and the head, wherein the spacer has an untapped bore passing through it for passage of the shank of the screw, so that when the screw is introduced through the passage bore of the space, then screwed inside the tapped bore while the attachment end is engaged in the cell of the disk, the head of the screw comes into abutment against said spacer and presses it against the two lateral teeth situated on either side of said cell of the rotor disk this causes the displacement of the false blade toward the outside of the disk, so as to simulate a centrifugal acceleration applied to said false blade.

6. The device according to claim 1, wherein the body of said false blade comprises a recess formed to receive a grommet of said rotor disk and this recess extends in a plane parallel to the screwing axis of the screw in the false blade and leads to the attachment end.

7. The device according to claim 1, wherein the spacer is made of a material of lower mechanical stiffness than the material constituting the lateral teeth of the disk.

\* \* \* \* \*